US011202299B2

(12) United States Patent
Zhang (10) Patent No.: US 11,202,299 B2
(45) Date of Patent: Dec. 14, 2021

(54) METHOD AND DEVICE FOR RADIO RESOURCE MANAGEMENT MEASUREMENT

(71) Applicant: GUANGDONG OPPO MOBILE TELECOMMUNICATIONS CORP., LTD., Guangdong (CN)

(72) Inventor: Zhi Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 69 days.

(21) Appl. No.: 16/613,341

(22) PCT Filed: Jun. 15, 2017

(86) PCT No.: PCT/CN2017/088524
§ 371 (c)(1),
(2) Date: Nov. 13, 2019

(87) PCT Pub. No.: WO2018/227509
PCT Pub. Date: Dec. 20, 2018

(65) Prior Publication Data
US 2021/0084662 A1    Mar. 18, 2021

(51) Int. Cl.
*H04W 24/10* (2009.01)
*H04W 72/08* (2009.01)
*H04W 48/10* (2009.01)
*H04W 48/16* (2009.01)

(52) U.S. Cl.
CPC ......... *H04W 72/085* (2013.01); *H04W 24/10* (2013.01); *H04W 48/10* (2013.01); *H04W 48/16* (2013.01)

(58) Field of Classification Search
CPC ... H04W 72/085; H04W 24/10; H04W 48/10; H04W 48/16
See application file for complete search history.

(56) References Cited

U.S. PATENT DOCUMENTS

| 9,681,325 | B2* | 6/2017 | Chen | H04L 5/0048 |
| 2012/0155312 | A1* | 6/2012 | Kim | H04W 24/10 |
| | | | | 370/252 |
| 2015/0312789 | A1* | 10/2015 | You | H04B 17/318 |
| | | | | 370/252 |

(Continued)

FOREIGN PATENT DOCUMENTS

| CN | 102215502 | 10/2011 |
| CN | 103686778 | 3/2014 |

(Continued)

OTHER PUBLICATIONS

NTT Docomo et al., "Way forward on initial access and mobility for wider BW operation," 3GPP TSG RAN WG1 Meeting #89, R1-1709505, May 2017, 5 pages.

(Continued)

*Primary Examiner* — Julio R Perez
(74) *Attorney, Agent, or Firm* — Hodgson Russ LLP (57) ABSTRACT

Provided are a method and device for radio resource management measurement. The method includes: sending, by a network device, measurement configuration information to a terminal device, the measurement configuration information comprising measurement mode information and/or report mode information, the measurement mode information being configured to indicate a target measurement mode in which the terminal device performs a RRM measurement based on at least one of a plurality of synchronization signal blocks transmitted in a target broadband component carrier, and the report mode information being configured to indicate a target report mode in which the terminal device reports a measurement result obtained by performing the RRM measurement based on the at least one of the plurality of synchronization signal blocks.

18 Claims, 3 Drawing Sheets

(56) References Cited

U.S. PATENT DOCUMENTS

2016/0044615 A1* 2/2016 Bashar .............. H04W 72/0413
370/280
2017/0026938 A1 1/2017 Onggosanusi et al.

FOREIGN PATENT DOCUMENTS

| CN | 103916903 | 7/2014 |
| --- | --- | --- |
| CN | 106256100 | 12/2016 |
| EP | 2963965 | 1/2016 |
| WO | 2016147994 | 9/2016 |
| WO | 2016203290 | 12/2016 |

OTHER PUBLICATIONS

AT&T, "Measurement based on SS block," 3GPP TSG RAN WG1 Meeting #89, R1-1707757, May 2017, 2 pages.
Guangdong Oppo Mobile Telecom, "Remaining details on multiple SS block transmissions in wideband CC," 3GPP TSG RAN WG1 NR Ad-Hoc#2, R1-1710133, Jun. 2017, 4 pages.
EPO, Office Action for EP Application No. 17913931.6, dated Apr. 14, 2020.
SIPO, First Office Action for CN Application No. 201780090499.1, dated May 29, 2020.
WIPO, ISR for PCT/CN2017/088524, Aug. 23, 2017.
SIPO, Second Office Action for CN Application No. 201780090499.1, dated Jul. 30, 2020.
IPI, Office Action for IN Application No. 201917046767, dated Mar. 10, 2021.
Nokia et al., "SS block RSRP measurements," 3GPP TSG RAN WG1#89, R1-1708237, May 2017, 4 pages.
LG Electronics, "SS block based RRM measurement," 3GPP TSG RAN WG1 Meeting #89, R1-1707595, May 2017, 3 pages.
TIPO, Office Action for TW Application No. 107120591, dated Oct. 12, 2021.

* cited by examiner

100

Send, by a network device, measurement configuration information to a terminal device, the measurement configuration information comprising measurement mode information and/or report mode information, the measurement mode information being configured to indicate a target measurement mode in which the terminal device performs a RRM measurement based on at least one of a plurality of synchronization signal blocks transmitted in a target broadband component carrier, and the report mode information being configured to indicate a target report mode in which the terminal device reports a measurement result obtained by performing the RRM measurement based on the at least one of the plurality of synchronization signal blocks

| Receive, by a terminal device, measurement configuration information sent from a network device, the measurement configuration information comprising measurement mode information and/or report mode information, the measurement mode information being configured to indicate a target measurement mode in which the terminal device performs a RRM measurement based on at least one of a plurality of synchronization signal blocks transmitted in a target broadband component carrier, the report mode information being configured to indicate a target report mode in which the terminal device reports a measurement result obtained by performing the RRM measurement based on the at least one of the plurality of synchronization signal blocks | ~ S210 |

| Perform the RRM measurement and/or reporting the measurement result, by the terminal device, based on the at least one of the plurality of synchronization signal blocks according to the measurement configuration information | ~ S220 |

METHOD AND DEVICE FOR RADIO RESOURCE MANAGEMENT MEASUREMENT

CROSS-REFERENCE TO RELATED APPLICATION

This application is a U.S. national phase application of International Application No. PCT/CN2017/088524, filed Jun. 15, 2017, the entire disclosure of which is incorporated herein by reference.

TECHNICAL FIELD

Embodiments of the present disclosure relate to communication technologies, and more particularly, to methods and devices for radio resource management measurement.

BACKGROUND

A Long Term Revolution (LTE) system supports a single carrier operation and a Carrier Aggregation (CA) operation. For the single carrier operation, there are only a Primary Synchronization Signal (PSS) and a Secondary Synchronization Signal (SSS) in a system bandwidth in terms of a frequency domain. For the carrier aggregation operation, a maximum bandwidth of a component carrier of LTE is 20 MHz and there is only one PSS/SSS channel in each of the component carriers in the frequency domain. Particularly, six Physical Resource Blocks (PRBs) occupied by PSS/SSS of the LTE system are positioned at the central location of the system bandwidth.

In a future communication system, a network device can send to a terminal a plurality of Synchronization Signal (SS) blocks, each SS block including a PSS, an SSS and a Physical Broadcast Channel (PBCH).

Therefore, there is a need to provide a method for radio resource management measurement to meet the requirements for a radio resource management measurement in a communication system in which a network device transmits a plurality of SS Blocks to a terminal device.

SUMMARY

The present disclosure provides methods and devices for radio resource management measurement to meet the requirements for a radio resource management measurement in a communication system in which a network device transmits a plurality of SS Blocks to a terminal device.

According to a first aspect, there is provided a method for radio resource management (RRM) measurement, including: sending, by a network device, measurement configuration information to a terminal device, the measurement configuration information including measurement mode information and/or report mode information, the measurement mode information being configured to indicate a target measurement mode in which the terminal device performs RRM measurement based on at least one of a plurality of synchronization signal blocks transmitted in a target broadband component carrier, the report mode information being configured to indicate a target report mode in which the terminal device reports a measurement result obtained by performing the RRM measurement based on the at least one of the plurality of synchronization signal blocks.

In the method for measuring the radio resource management in the embodiments of the present disclosure, the network device sends the measurement configuration information including the measurement mode information and/or the report mode information to the terminal device, so that the terminal device performs the radio resource management measurement based on the at least one of the plurality of synchronization signal blocks in one broadband component carrier according to the measurement configuration information. Thus, the embodiments of the present disclosure can meet the requirements for the measurement of the radio resource management in the communication system in which the network device sends the plurality of synchronization signal blocks to the terminal device.

According to the first aspect, in an implementation of the first aspect, the method further includes: determining, by the network device, the target measurement mode according to at least one of whether the plurality of synchronization signal blocks are from co-located network devices, signal propagation characteristics of a plurality of frequency bands corresponding to a plurality of frequency domain locations carrying the plurality of synchronization signal blocks and a frequency domain location of a frequency domain resource configured by the network device for the terminal device.

In this way, the network device can configure different measurement modes and/or report modes for the terminal device based on different application scenarios, which reduces the complexity in carrying out the RRM measurement and/or reporting the measurement result by the terminal device.

According to the first aspect and its above-mentioned implementation, in another implementation of the first aspect, the target measurement mode is one of the following measurement modes that: the RRM measurement is performed based on each of the plurality of synchronization signal blocks, the RRM measurement is performed based on each of a part of the plurality of synchronization signal blocks as indicated by the network device, the RRM measurement is performed based on one synchronization signal block that is selected by the terminal device, and the RRM measurement is performed based on all or a part of the plurality of synchronization signal blocks to obtain one measurement result.

Optionally, if the target measurement mode is that the RRM measurement is performed based on a part of the plurality of synchronization signal blocks to obtain one measurement result, the measurement mode information further indicates a frequency domain location for carrying the part of the plurality of synchronization signal blocks, and/or, the measurement mode information also indicates the numbering of the part of the plurality of synchronization signal blocks in a frequency domain.

According to the first aspect and its above-mentioned implementations, in another implementation of the first aspect, if the target measurement mode is that the RRM measurement is performed based on all or a part of the plurality of synchronization signal blocks to obtain one measurement result, the one measurement result is an average of a plurality of intermediate measurement results obtained by performing the RRM measurement based on each of all or a part of the plurality of synchronization signal blocks.

Namely, if the measurement mode information indicates that the target measurement mode is to perform the RRM measurement based on all or a part of the plurality of synchronization signal blocks, when the terminal device performs the RRM measurement, the terminal device obtains a plurality of intermediate measurement results by performing the RRM measurement based on each synchronization signal block and averages the intermediate measurement results to obtain one measurement result.

It can be understood that the above averaging is only an exemplary implementation and the present disclosure can utilize all processing methods capable of processing a plurality of values to obtain one value.

According to the first aspect and its above-mentioned implementations, in another implementation of the first aspect, the target report mode is that all measurement results obtained by performing the RRM measurement based on at least one of the plurality of synchronization signal blocks are reported; or, the target report mode is that one of all measurement results obtained by performing the RRM measurement based on at least one of the plurality of synchronization signal blocks is reported.

According to the first aspect and its above-mentioned implementations, in another implementation of the first aspect, the configuration information includes the measurement mode information and the report mode information, and the method further includes: determining, by the network device, the target report mode according to the target measurement mode.

According to the first aspect and its above-mentioned implementations, in another implementation of the first aspect, sending the measurement configuration information to the terminal device includes: sending broadcast signaling to the terminal device, wherein the broadcast signaling includes the measurement configuration information; or, sending Radio Resource Control (RRC) signaling to the terminal device, wherein the RRC signaling includes the measurement configuration information; or, sending Downlink Control Information (DCI) to the terminal device, wherein the DCI includes the measurement configuration information.

According to the first aspect and its above-mentioned implementations, in another implementation of the first aspect, the RRM measurement includes the measurement of Reference Signal Receiving Power (RSRP).

Optionally, the RRM measurement further includes the measurement of Reference Signal Receiving Quality (RSRQ).

According to a second aspect, there is provided a method for measuring radio resource management, including: receiving, by a terminal device, measurement configuration information sent from a network device, the measurement configuration information including measurement mode information and/or report mode information, the measurement mode information being configured to indicate a target measurement mode in which the terminal device performs RRM measurement based on at least one of a plurality of synchronization signal blocks transmitted in a target broadband component carrier, the report mode information being configured to indicate a target report mode in which the terminal device reports a measurement result obtained by performing the RRM measurement based on the at least one of the plurality of synchronization signal blocks; performing the RRM measurement and/or reporting the measurement result, by the terminal device, based on the at least one of the plurality of synchronization signal blocks according to the measurement configuration information.

In the method for the radio resource management measurement in the embodiments of the present disclosure, the terminal device receives the measurement configuration information including the measurement mode information and/or the report mode information sent from the network device, so that the terminal device performs the radio resource management measurement based on the at least one of the plurality of synchronization signal blocks in one broadband component carrier according to the measurement configuration information. Thus, the embodiments of the present disclosure can meet the requirements for the measurement of the radio resource management in the communication system in which the network device sends the plurality of synchronization signal blocks to the terminal device.

It shall be noted that if the measurement configuration information includes only the measurement mode information, the terminal device performs the RRM measurement according to the target measurement mode indicated by the measurement mode information; then, when the measurement result needs to be reported, the terminal device reports the measurement result in a mode pre-agreed by the terminal device and the network device. If the measurement configuration information includes only the measurement mode information, the terminal device may only perform the RRM measurement without reporting the measurement result, or the terminal device performs the RRM measurement and reports the measurement result.

If the measurement configuration information includes only the report mode information, after performing the RRM measurement, the terminal device reports the measurement result when the measurement result is required to be reported according to the target report mode indicated by the report mode information. In this case, the terminal device can perform the RRM measurement in a measurement mode that is pre-agreed by the terminal device and the network device.

If the measurement configuration information includes both the measurement mode information and the report mode information, the terminal device performs the RRM measurement according to the target measurement mode indicated by the measurement mode information, and reports the measurement result according to the target report mode indicated by the report mode information.

According to the second aspect, in an implementation of the second aspect, the target measurement mode is determined by the network device according to at least one of the following: whether the plurality of synchronization signal blocks are from co-located network devices, signal propagation characteristics of a plurality of frequency bands corresponding to a plurality of frequency domain locations carrying the plurality of synchronization signal blocks and a frequency domain location of a frequency domain resource configured by the network device for the terminal device.

According to the second aspect and its above-mentioned implementation, in another implementation of the second aspect, the target measurement mode is one of the following measurement modes that: the RRM measurement is performed based on each of the plurality of synchronization signal blocks, the RRM measurement is performed based on each of a part of the plurality of synchronization signal blocks as indicated by the network device, the RRM measurement is performed based on one synchronization signal block that is selected by the terminal device, and the RRM measurement is performed based on all or a part of the plurality of synchronization signal blocks to obtain one measurement result.

According to the second aspect and its above-mentioned implementations, in another implementation of the second aspect, if the target measurement mode is that the RRM measurement is performed based on all or a part of the plurality of synchronization signal blocks to obtain one measurement result, the one measurement result is an average of a plurality of intermediate measurement results obtained by performing the RRM measurement based on each of all or a part of the plurality of synchronization signal blocks.

According to the second aspect and its above-mentioned implementations, in another implementation of the second aspect, the target report mode is that all measurement results obtained by performing the RRM measurement based on at least one of the plurality of synchronization signal blocks are reported; or, the target report mode is that one of all measurement results obtained by performing the RRM measurement based on at least one of the plurality of synchronization signal blocks is reported.

According to the second aspect and its above-mentioned implementations, in another implementation of the second aspect, the configuration information includes the measurement mode information and the report mode information and the target report mode is determined by the network device according to the target measurement mode.

According to the second aspect and its above-mentioned implementations, in another implementation of the second aspect, receiving the measurement configuration information sent from the network device includes: receiving broadcast signaling sent from the network device, wherein the broadcast signaling includes the measurement configuration information; or, receiving Radio Resource Control (RRC) signaling sent from the network device, wherein the RRC signaling includes the measurement configuration information; or, receiving Downlink Control Information (DCI) sent from the network device, wherein the DCI includes the measurement configuration information.

According to the second aspect and its above-mentioned implementations, in still another implementation of the second aspect, the RRM measurement includes the measurement of Reference Signal Receiving Power (RSRP).

According to a third aspect, there is provided a network device configured to perform the method according to the first aspect or any of the possible implementations in the first aspect described above. Particularly, the network device includes functional modules configured to perform the method according to the first aspect or any of the possible implementations in the first aspect described above.

According to a fourth aspect, there is provided a terminal device configured to perform the method according to the second aspect or any of the possible implementations in the second aspect described above. Particularly, the terminal device includes functional modules configured to perform the method according to the second aspect or any of the possible implementations in the second aspect described above.

According to a fifth aspect, there is provided a network device including a processor, a memory and a transceiver. The processor, the memory and the transceiver communicate with each other through an internal connection path to transfer control and/or data signals, so that the network device performs the method according to the first aspect or any of the possible implementations in the first aspect described above.

According to a sixth aspect, there is provided a terminal device including a processor, a memory and a transceiver. The processor, the memory and the transceiver communicate with each other through an internal connection path to transfer control and/or data signals, so that the terminal device performs the method according to the second aspect or any of the possible implementations in the second aspect described above.

According to a seventh aspect, there is provided a computer readable medium configured to store computer programs which comprise instructions for performing the method according to the first aspect or any of the possible implementations in the first aspect described above.

According to an eighth aspect, there is provided a computer readable medium configured to store computer programs which comprise instructions for performing the method according to the second aspect or any of the possible implementations in the second aspect described above.

According to a ninth aspect, there is provided a computer program product including instructions which, when executed by a computer, cause the computer to perform the method for radio resource management measurement according to the first aspect or any of the possible implementations in the first aspect described above. Particularly, the computer program product can be run on the network device according to the third or fifth aspect described above.

According to a tenth aspect, there is provided a computer program product including instructions which, when executed by a computer, cause the computer to perform the method for radio resource management measurement according to the second aspect or any of the possible implementations in the second aspect described above. Particularly, the computer program product can be run on the terminal device according to the fourth or sixth aspect described above.

DETAILED DESCRIPTION

The technical solutions in the embodiments of the present disclosure will be clearly and completely described below in conjunction with the accompanying drawings in the embodiments.

It shall be understood that the technical solutions in the embodiments of the present disclosure can be applied to various communication systems, for example, Global System of Mobile Communication (GSM) system, Code Division Multiple Access (CDMA) system, Wideband Code Division Multiple Access (WCDMA) system, General Packet Radio Service (GPRS), Long Term Evolution (LTE) system, LTE Frequency Division Duplex (FDD) system, LTE Time Division Duplex (TDD), Universal Mobile Telecommunication System (UMTS), Worldwide Interoperability for Microwave Access (WiMAX) communication system, a 5G system or a New Radio (NR) system.

In the embodiments of the present disclosure, the terminal device may include, but it is not limited to, a Mobile Station (MS), a Mobile Terminal, a Mobile Telephone, User Equipment (UE), a handset, portable equipment, a vehicle, or the like. The terminal device can communicate with one or more core networks via a Radio Access Network (RAN). For example, the terminal device can be a mobile phone (or "cellular" phone) or a computer having a radio communication function or the like. The terminal device can also be a portable, pocket-sized, handheld, computer-integrated or in-vehicle mobile device.

The network device involved in the embodiments of the present disclosure is an apparatus deployed in a radio access network to provide a radio communication function for the terminal device. The network device can be a base station, which can include various forms of macro base stations, micro base stations, relay stations, access points, and the like. In systems using various radio access technologies, devices with base station functionality may have different names. For example, an Evolved NodeB (eNB or eNodeB) in an LTE network is called a Node B in the 3rd Generation (3G) network or the like.

It shall be noted that in the embodiments of the present disclosure, performing the RRM measurement by the terminal device based on the synchronization signal block(s) includes performing the RRM measurement by the terminal device based on a secondary synchronization signal carried in the synchronization signal block(s), or performing the RRM measurement by the terminal device based on a secondary synchronization signal carried in the synchronization signal block(s) and a Demodulation Reference Signal (DMRS) carried in the Physical Broadcast Channel (PBCH) in the synchronization signal block(s).

The RRM measurement in the embodiments of the present disclosure includes at least the Reference Signal Receiving Power (RSRP) measurement.

Figure 1:
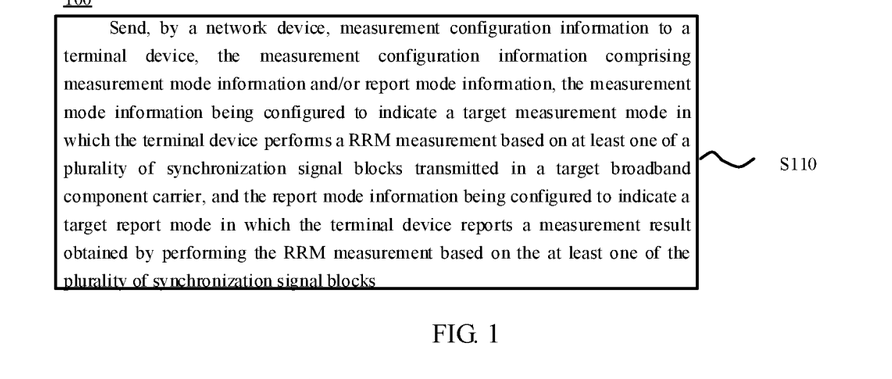
FIG. 1 is a schematic flowchart of a method for measuring radio resource management according to an embodiment of the present disclosure.

FIG. 1 illustrates a method for measuring radio resource management according to an embodiment of the present disclosure. As illustrated in FIG. 1, a method 100 includes the following steps.

In S110, a network device sends measurement configuration information to a terminal device. The measurement configuration information includes measurement mode information and/or report mode information. The measurement mode information is configured to indicate a target measurement mode in which the terminal device performs a RRM measurement based on at least one of a plurality of synchronization signal blocks transmitted in a target broadband component carrier. The report mode information is configured to indicate a target report mode in which the terminal device reports a measurement result obtained by performing the RRM measurement based on the at least one of the plurality of synchronization signal blocks.

In the embodiment of the present disclosure, optionally, the network device determines the target measurement mode according to at least one of the following: whether the plurality of synchronization signal blocks are from co-located network devices, signal propagation characteristics of frequency bands corresponding to a plurality of frequency domain locations carrying the plurality of synchronization signal blocks, and a frequency domain location of a frequency domain resource configured by the network device for the terminal device.

Figure 2:
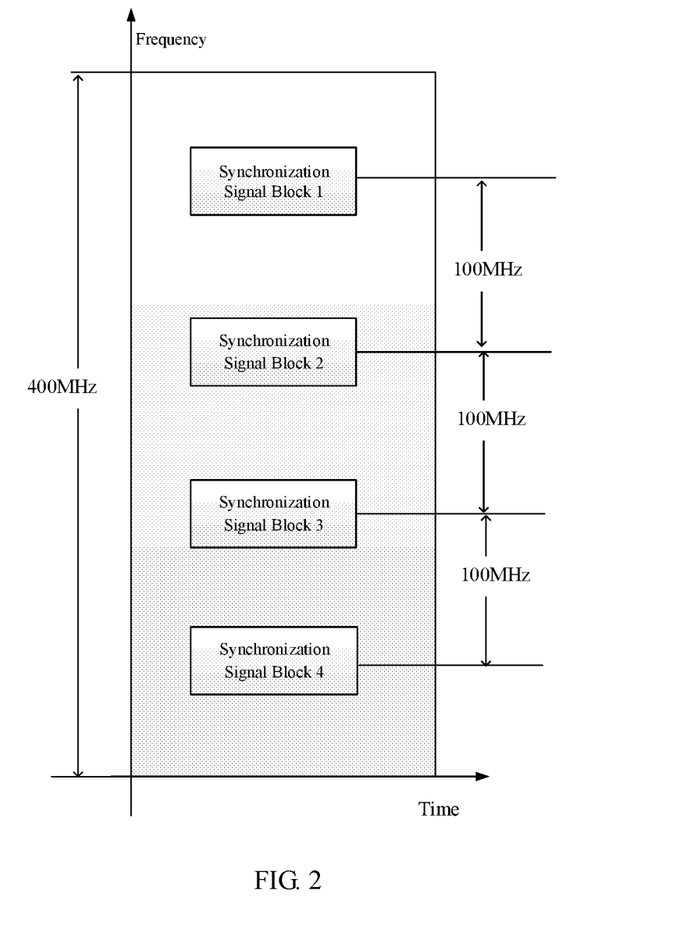
FIG. 2 is a diagram showing the distribution of synchronization signal blocks on a broadband component carrier according to an embodiment of the present disclosure.

For example, as illustrated in FIG. 2, a bandwidth of a broadband component carrier is 400 MHz and four SS blocks need to be transmitted in the broadband component carrier, namely, a synchronization signal block 1 (SS block 1), a synchronization signal block 2 (SS block 2), a synchronization signal block 3 (SS block 3) and a synchronization signal block 4 (SS block 4). The four SS blocks are evenly distributed at a frequency interval of 100 MHz. If the network device determines that the four SS blocks are from multiple network devices that are not co-located, or sub-frequency bands corresponding to four frequency domain locations carrying the four SS blocks are from multiple network devices that are not co-located, path losses from the network devices to the terminal device may be different and the terminal device needs to measure the channel conditions of the network devices. As another example, if the network device determines that propagation characteristics of the sub-frequency bands corresponding to the multiple frequency domain locations carrying the four SS blocks are different, the terminal device is also required to measure channel conditions of the sub-frequency bands corresponding to the frequency domain locations. If the network device determines that the target measurement mode indicated by measurement mode indication information is to perform the RRM measurement based on each of the four synchronization signal blocks, the terminal device performs the RRM measurement based on the four synchronization signal blocks respectively to obtain four measurement results.

Correspondingly, the terminal device can report the measurement results in a report mode which is agreed by the terminal device and the network device, or in the target report mode indicated by the report mode information, when the measurement results are required to be reported. For example, if the target report mode is to report all of the obtained measurement results, the terminal device is required to report the obtained four measurement results to the network device. Alternatively, if the target report mode is to report one of the measurement results, the terminal device selects one from the above-described four measurement results and reports it. For example, the terminal device may select the best one of the four measurement results to report to the network device, or the terminal device may select the worst one of the four measurement results to report to the network device, or the terminal device may select a medium one of the four measurement results to report to the network device.

As another example, if a frequency domain location of a frequency domain resource configured by the network device for the terminal device is located in a sub-frequency band corresponding to one of the plurality of frequency domain locations carrying the four SS blocks, for example, in the sub-frequency band corresponding to the frequency domain location carrying the SS block 2, the terminal device is only required to know the channel condition of the sub-frequency band corresponding to the frequency domain location at which the SS block 2 is carried. As another example, if the network device determines that the propagation characteristics of the sub-frequency bands corresponding to the multiple frequency domain locations carrying the four SS blocks are consistently good, the terminal device is only required to measure the channel condition of the sub-frequency band corresponding to one frequency domain location. The network device determines that the target measurement mode indicated by the measurement mode information is to perform RRM measurement based on each of the part of the synchronization signal blocks indicated by the network device. For example, if the target measurement mode indicates that the terminal device performs the RRM measurement based on the SS block 2 and the SS block 3, the terminal device can perform the RRM measurement based on the SS block 2 and the SS block 3 respectively to obtain two measurement results. As another example, if the target measurement mode indicates that the terminal device performs the RRM measurement based on the SS block 2, the terminal device performs the RRM measurement based on the SS block 2 to obtain one measurement result.

Correspondingly, the terminal device can report the measurement result in a report mode agreed by the terminal device and the network device, or in the target report mode indicated by the report mode information, when the measurement result is required to be reported. The types of the target report mode are the same as those described above. To avoid repetition, details will not be described herein.

As another example, if the network device determines that the propagation characteristics of the sub-frequency bands corresponding to the multiple frequency domain locations carrying the four SS blocks are consistently good, the network device may determine that the target measurement mode indicated by the measurement mode information is to perform the RRM measurement based on one synchronization signal block that is selected by the terminal device. In this case, the network device does not specify which one of the above four SS blocks is based for the terminal device to perform the RRM measurement, but the terminal device performs the RRM measurement based on one SS block that is selected by the terminal device itself. The SS block selected by the terminal device may be the only SS block searched by the terminal device or any of a plurality of SS blocks searched by the terminal device. For example, if the terminal device detects the SS block 1 first, the terminal device may perform the RRM measurement directly based on the SS block 1 to obtain one measurement result without the detection of other SS blocks. As another example, if the terminal device successfully detects the SS block 1, the SS block 2 and the SS block 3 finally, the terminal device may select one of the three SS blocks such as the SS block 3 to perform the RRM measurement to obtain one measurement result.

Correspondingly, the terminal device reports the obtained measurement result to the network device when the measurement result is required to be reported. It can be understood that in this case, the target report mode indicated by the report mode information is to report all of the obtained measurement results or one of all the obtained measurement results.

As another example, if the network device determines that the propagation characteristics of the sub-frequency bands corresponding to the multiple frequency domain locations carrying the four SS blocks are consistently good, the network device determines that the target measurement mode indicated by the measurement mode information is to perform the RRM measurement based on all or a part of a plurality of synchronization signal blocks to obtain one measurement result. In this case, the measurement mode information can further specifically indicate frequency domain locations that carry the all or a part of the synchronization signal blocks, so that the terminal device detects the all or a part of the synchronization signal blocks at the frequency domain locations and performs the RRM measurement based on the all or a part of the synchronization signal blocks to obtain one measurement result. As an example, the terminal device performs the RRM measurement based on all or a part of the synchronization signal blocks to obtain a plurality of intermediate measurement results, and then the terminal device averages the intermediate measurement results to obtain one measurement result. For example, if the target measurement mode indicates that the terminal device performs the RRM measurement based on the SS block 2 and the SS block 3, and specifically indicates the frequency domain locations carrying the SS block2 and the SS block3, the terminal device then detects the SS block2 and the SS block3 at the frequency domain locations indicated by target measurement mode indication information, and performs the RRM measurement based on the SS block2 and the SS block3 respectively to obtain two measurement results. Then, the terminal device averages the two measurement results to obtain one measurement result. As another example, if the target measurement mode indicates that the terminal device performs the RRM measurement based on all of the SS blocks, the terminal device performs the RRM measurements based on the SS block1, the SS block2, the SS block3 and the SS block4 respectively to obtain four measurement results, and then average the four measurement results to obtain one measurement result.

Correspondingly, the terminal device reports the obtained measurement result(s) to the network device when the measurement result(s) is(are) required to be reported. It can be understood that in this case, the target report mode indicated by the report mode information is to report all of the obtained measurement results or one of all the obtained measurement results.

In this way, a terminal device having a relatively wide operation bandwidth can perform the RRM measurement based on multiple SS blocks at the same time, and then average the obtained intermediate results, thereby improving the measurement quality, and accordingly reducing time overhead of measurement.

In all of the above embodiments, optionally, the measurement configuration information is carried in the broadcast signaling or the terminal device level Radio Resource Control (RRC) signaling sent from the network device to the terminal device to the terminal device of the measurement configuration information; or, the measurement configuration information is carried in the dynamic Downlink Control Information (DCI) sent from the network device to the terminal device.

The method for radio resource management measurement according to the embodiments of the present disclosure is described above in detail from the perspective of the network device with reference to FIGS. 1 and 2. Hereinafter, a method for radio resource management measurement according to embodiments of the present disclosure will be described in detail from the perspective of the terminal device with reference to FIG. 3. It should be understood that the interaction between the network device and the terminal device described from the perspective of the terminal device is the same as that described from the perspective of the network device. For clarity, repeated descriptions are omitted.

Figure 3:
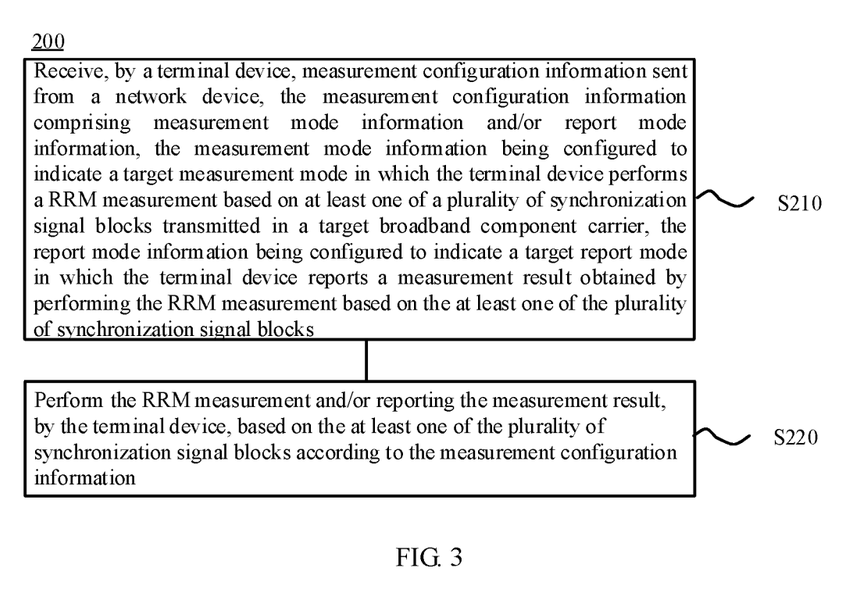
FIG. 3 is a schematic flowchart of a method for measuring radio resource management according to another embodiment of the present disclosure.

FIG. 3 illustrates a method for radio resource management measurement according to another embodiment of the present disclosure. As illustrated in FIG. 3, a method 200 includes the following steps.

In S210, a terminal device receives measurement configuration information sent from a network device. The measurement configuration information includes measurement mode information and/or report mode information. The measurement mode information is configured to indicate a target measurement mode in which the terminal device performs a RRM measurement based on at least one of a plurality of synchronization signal blocks transmitted in a target broadband component carrier. The report mode information is configured to indicate a target report mode in which the terminal device reports a measurement result obtained by performing the RRM measurement based on the at least one of the plurality of synchronization signal blocks.

In S220, the terminal device performs the RRM measurement and/or reports the measurement result based on the at least one of the plurality of synchronization signal blocks according to the measurement configuration information.

Therefore, according to the method for the radio resource management measurement in the embodiments of the present disclosure, the terminal device receives the measurement configuration information including the measurement mode information and/or the report mode information sent from the network device, so that the terminal device performs the radio resource management measurement based on the at least one of the plurality of synchronization signal blocks in one broadband component carrier according to the measurement configuration information. Thus, the embodiments of the present application can meet the requirements for the measurement of the radio resource management in the communication system in which the network device sends the plurality of synchronization signal blocks to the terminal device.

In the embodiments of the present disclosure, optionally, the target measurement mode is determined by the network device according to at least one of the following information: whether the plurality of synchronization signal blocks are from co-located network devices, signal propagation characteristics of a plurality of frequency bands corresponding to a plurality of frequency domain locations carrying the plurality of synchronization signal blocks and a frequency domain location of a frequency domain resource configured by the network device for the terminal device.

In the embodiments of the present disclosure, optionally, the target measurement mode is one of the following measurement modes that: the RRM measurement is performed based on each of the plurality of synchronization signal blocks, the RRM measurement is performed based on each of a part of the plurality of synchronization signal blocks as indicated by the network device, the RRM measurement is performed based on one synchronization signal block that is selected by the terminal device, and the RRM measurement is performed based on all or a part of the plurality of synchronization signal blocks to obtain one measurement result.

In the embodiment of the present disclosure, optionally, if the target measurement mode is that the RRM measurement is performed based on all or a part of the plurality of synchronization signal blocks to obtain one measurement result, the one measurement result is an average of a plurality of intermediate measurement results obtained by performing the RRM measurement based on each of all or a part of the plurality of synchronization signal blocks.

In the embodiment of the present disclosure, optionally, the target report mode is that all measurement results obtained by performing the RRM measurement based on at least one of the plurality of synchronization signal blocks are reported; or, the target report mode is that one of all measurement results obtained by performing the RRM measurement based on at least one of the plurality of synchronization signal blocks is reported.

In the embodiments of the present disclosure, optionally, the configuration information includes the measurement mode information and the report mode information, and the target report mode is determined by the network device according to the target measurement mode.

In the embodiment of the present disclosure, optionally, S210 specifically includes: receiving broadcast signaling sent from the network device, wherein the broadcast signaling includes the measurement configuration information; or, receiving radio resource control (RRC) signaling sent from the network device, wherein the RRC signaling includes the measurement configuration information; or, receiving downlink control information (DCI) sent from the network device, wherein the DCI includes the measurement configuration information.

In the embodiment of the present disclosure, optionally, the RRM measurement includes the measurement of reference signal receiving power (RSRP).

Figure 4:
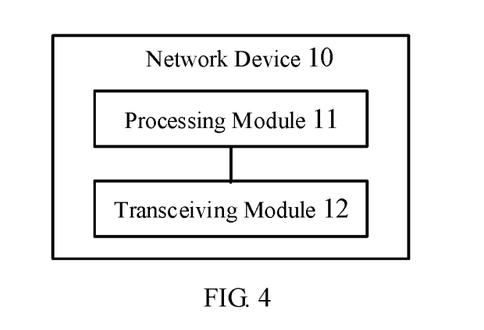
FIG. 4 is a schematic block diagram of a network device according to an embodiment of the present disclosure.

The method for radio resource management measurement according to the embodiments of the present disclosure is described above in detail with reference to FIGS. 1 to 3. Hereinafter, a network device according to an embodiment of the present disclosure will be described in detail with reference to FIG. 4. As illustrated in FIG. 4, a network device 10 includes a processing module 11 and a transceiving module 12.

The processing module 11 is configured to determine measurement configuration information.

The transceiving module 12 is configured to send the measurement configuration information to a terminal device. The measurement configuration information includes measurement mode information and/or report mode information. The measurement mode information is configured to indicate a target measurement mode in which the terminal device performs a RRM measurement based on at least one of a plurality of synchronization signal blocks transmitted in a target broadband component carrier. The report mode information is configured to indicate a target report mode in which the terminal device reports a measurement result obtained by performing the RRM measurement based on the at least one of the plurality of synchronization signal blocks.

Therefore, the network device according to the embodiment of the present disclosure sends the measurement configuration information including the measurement mode information and/or the report mode information to the terminal device, so that the terminal device performs the radio resource management measurement based on the at least one of the plurality of synchronization signal blocks in one broadband component carrier according to the measurement configuration information. Thus the embodiments of the present disclosure can meet the requirements for the measurement of the radio resource management in the communication system in which the network device sends the plurality of synchronization signal blocks to the terminal device.

In the embodiments of the present disclosure, optionally, the processing module 11 is further configured to: determine the target measurement mode according to at least one kind of the following information: whether the plurality of synchronization signal blocks are from co-located network devices, signal propagation characteristics of a plurality of frequency bands corresponding to a plurality of frequency domain locations carrying the plurality of synchronization signal blocks, and a frequency domain location of a frequency domain resource configured by the network device for the terminal device.

In the embodiments of the present disclosure, optionally, the target measurement mode is one of the following measurement modes that: the RRM measurement is performed based on each of the plurality of synchronization signal blocks, the RRM measurement is performed based on each of a part of the plurality of synchronization signal blocks as indicated by the network device, the RRM measurement is performed based on one synchronization signal block that is selected by the terminal device, and the RRM measurement is performed based on all or a part of the plurality of synchronization signal blocks to obtain one measurement result.

In the embodiments of the present disclosure, optionally, if the target measurement mode is that the RRM measurement is performed based on all or a part of the plurality of synchronization signal blocks to obtain one measurement result, the one measurement result is an average of a plurality of intermediate measurement results obtained by performing the RRM measurement based on each of all or a part of the plurality of synchronization signal blocks.

In the embodiment of the present disclosure, optionally, the target report mode is to report all measurement results obtained by performing the RRM measurement based on at least one of the plurality of synchronization signal blocks; or, the target report mode is to report one of all measurement results obtained by performing the RRM measurement based on at least one of the plurality of synchronization signal blocks.

In the embodiment of the present disclosure, optionally, the configuration information includes the measurement mode information and the report mode information, and the processing module 11 is further configured to determine the target report mode according to the target measurement mode.

In the embodiment of the present disclosure, optionally, the transceiving module 12 is specifically configured to: send broadcast signaling to the terminal device, wherein the broadcast signaling includes the measurement configuration information; or, send radio resource control (RRC) signaling to the terminal device, wherein the RRC signaling includes the measurement configuration information; or, send downlink control information (DCI) to the terminal device, wherein the DCI includes the measurement configuration information.

In the embodiments of the present disclosure, optionally, the RRM measurement includes the measurement of reference signal receiving power (RSRP).

For details of the network device according to the embodiments of the present disclosure, the descriptions regarding the method 100 of the embodiments of the present disclosure can be referred to. In addition, the units/modules in the network device and other operations and/or functions described above are respectively provided to implement the corresponding processes of the method 100, and repeated descriptions will not be provided for brevity.

Figure 5:
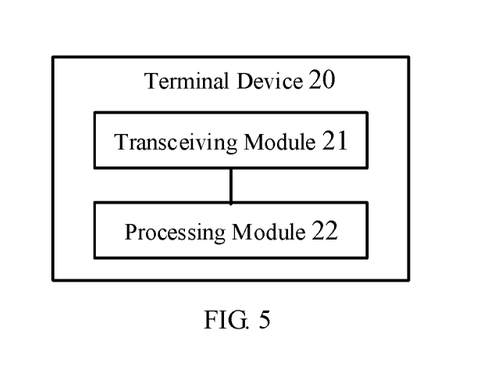
FIG. 5 is a schematic block diagram of a terminal device according to an embodiment of the present disclosure.

FIG. 5 illustrates a terminal device according to an embodiment of the present disclosure. As illustrated in FIG. 5, a terminal device 20 includes a transceiving module 21 and a processing module 22.

The transceiving module 21 is configured to receive measurement configuration information sent from a network device. The measurement configuration information includes measurement mode information and/or report mode information. The measurement mode information is configured to indicate a target measurement mode in which the terminal device performs a RRM measurement based on at least one of a plurality of synchronization signal blocks transmitted in a target broadband component carrier. The report mode information is configured to indicate a target report mode in which the terminal device reports a measurement result obtained by performing the RRM measurement based on the at least one of the plurality of synchronization signal blocks.

The processing module 22 is configured to perform the RRM measurement and/or report the measurement result based on the at least one of the plurality of synchronization signal blocks according to the measurement configuration information.

Therefore, the terminal device according to the embodiments of the present disclosure receives the measurement configuration information including the measurement mode information and/or the report mode information sent from the network device, so that the terminal device performs the radio resource management measurement based on the at least one of the plurality of synchronization signal blocks in one broadband component carrier according to the measurement configuration information. Thus, the embodiments of the present application can meet the requirements for the measurement of the radio resource management in the communication system in which the network device sends the plurality of synchronization signal blocks to the terminal device.

In the embodiment of the present disclosure, optionally, the target measurement mode is determined by the network device according to at least one kind of the following information: whether the plurality of synchronization signal blocks are from co-located network devices, signal propagation characteristics of a plurality of frequency bands corresponding to a plurality of frequency domain locations carrying the plurality of synchronization signal blocks, and a frequency domain location of a frequency domain resource configured by the network device for the terminal device.

In the embodiment of the present disclosure, optionally, the target measurement mode is one of the following measurement modes that: the RRM measurement is performed based on each of the plurality of synchronization signal blocks, the RRM measurement is performed based on each of a part of the plurality of synchronization signal blocks as indicated by the network device, the RRM measurement is performed based on one synchronization signal block that is selected by the terminal device, and the RRM measurement is performed based on all or a part of the plurality of synchronization signal blocks to obtain one measurement result.

In the embodiment of the present disclosure, optionally, if the target measurement mode is that the RRM measurement is performed based on all or a part of the plurality of synchronization signal blocks to obtain one measurement result, the one measurement result is an average of a plurality of intermediate measurement results obtained by performing the RRM measurement based on each of all or a part of the plurality of synchronization signal blocks.

In the embodiments of the present disclosure, optionally, the target report mode is to report all measurement results obtained by performing the RRM measurement based on at least one of the plurality of synchronization signal blocks; or, the target report mode is to report one of all measurement results obtained by performing the RRM measurement based on at least one of the plurality of synchronization signal blocks.

In the embodiments of the present disclosure, optionally, the configuration information includes the measurement mode information and the report mode information, and the target report mode is determined by the network device according to the target measurement mode.

In the embodiments of the present disclosure, optionally, the transceiving module 21 is specifically configured to: receive broadcast signaling sent from the network device, wherein the broadcast signaling includes the measurement configuration information; or, receive radio resource control (RRC) signaling sent from the network device, wherein the RRC signaling includes the measurement configuration information; or, receive downlink control information (DCI) sent from the network device, wherein the DCI includes the measurement configuration information.

In the embodiment of the present disclosure, optionally, the RRM measurement includes the measurement of reference signal receiving power (RSRP).

For details of the terminal device according to the embodiments of the present disclosure, previous descriptions regarding the method 200 of the embodiment of the present disclosure can be referred to. In addition, the units/modules in the terminal device and other operations and/or functions described above are respectively provided to implement the corresponding processes of the method 200, and repeated descriptions will not be provided for brevity.

Figure 6:
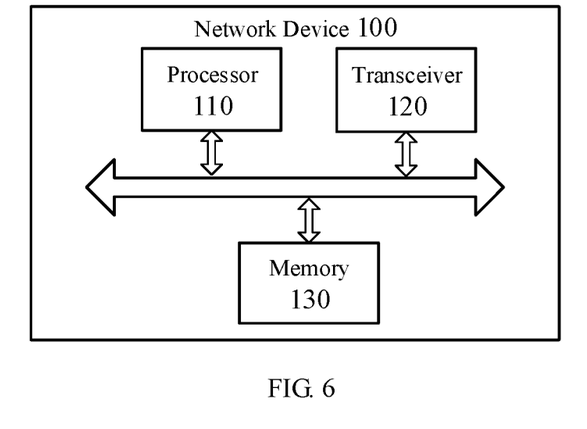
FIG. 6 is a schematic block diagram of a network device according to another embodiment of the present disclosure.

FIG. 6 illustrates a network device according to another embodiment of the present disclosure. As illustrated in FIG. 6, a network device 100 includes a processor 110 and a transceiver 120 connected to the processor 110. Optionally, the network device 100 further includes a memory 130 connected to the processor 110. The processor 110, the memory 130 and the transceiver 120 can communicate with each other through an internal connection path. The processor 110 is configured to determine measurement configuration information. The transceiver 120 is configured to send the measurement configuration information to a terminal device. The measurement configuration information includes measurement mode information and/or report mode information. The measurement mode information is configured to indicate a target measurement mode in which the terminal device performs a RRM measurement based on at least one of a plurality of synchronization signal blocks transmitted in a target broadband component carrier. The report mode information being configured to indicate a target report mode in which the terminal device reports a measurement result obtained by performing the RRM measurement based on the at least one of the plurality of synchronization signal blocks.

Therefore, the network device according to the embodiments of the present disclosure sends the measurement configuration information including the measurement mode information and/or the report mode information to the terminal device, so that the terminal device performs the radio resource management measurement based on the at least one of the plurality of synchronization signal blocks in one broadband component carrier according to the measurement configuration information. Thus, the embodiments of the present disclosure can meet the requirements for the measurement of the radio resource management in the communication system in which the network device sends the plurality of synchronization signal blocks to the terminal device.

For details of the network device 100 according to the embodiments of the present disclosure, descriptions regarding the network device 10 of the embodiments of the present disclosure can be referred to. In addition, the units/modules in the network device and other operations and/or functions described above are respectively provided to implement the corresponding processes of the method 100, and repeated descriptions will not be provided for brevity.

Figure 7:
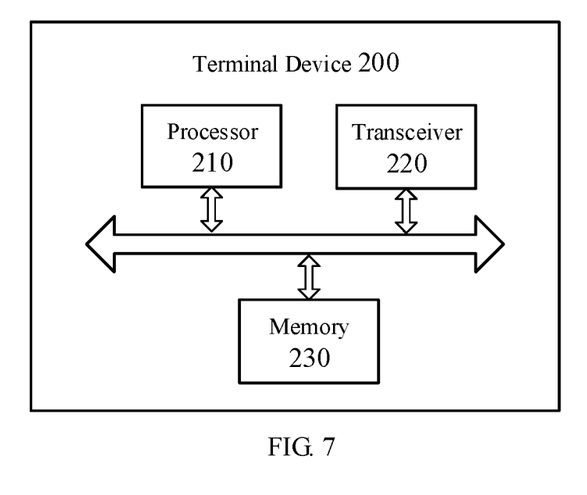
FIG. 7 is a schematic block diagram of a terminal device according to another embodiment of the present disclosure.

FIG. 7 is a schematic block diagram illustrating a terminal device according to another embodiment of the present disclosure. As illustrated in FIG. 7, a terminal device 200 includes a processor 210 and a transceiver 220 connected to the processor 210. Optionally, the terminal device 200 further includes a memory 230 connected to the processor 210. The processor 210, the memory 230 and the transceiver 220 can communicate with each other through an internal connection path. The transceiver 220 is configured to receive measurement configuration information sent from a network device. The measurement configuration information includes measurement mode information and/or report mode information. The measurement mode information is configured to indicate a target measurement mode in which the terminal device performs a RRM measurement based on at least one of a plurality of synchronization signal blocks transmitted in a target broadband component carrier. The report mode information is configured to indicate a target report mode in which the terminal device reports a measurement result obtained by performing the RRM measurement based on the at least one of the plurality of synchronization signal blocks. The processor 210 is configured to perform the RRM measurement and/or report the measurement result based on the plurality of synchronization signal blocks according to the measurement configuration information.

Therefore, the terminal device according to the embodiments of the present disclosure receives the measurement configuration information including the measurement mode information and/or the report mode information sent from the network device, so that the terminal device performs the radio resource management measurement based on the at least one of the plurality of synchronization signal blocks in one broadband component carrier according to the measurement configuration information. Thus, embodiments of the present application can meet the requirements for the measurement of the radio resource management in the communication system in which the network device sends the plurality of synchronization signal blocks to the terminal device.

For details of the terminal device 200 according to the embodiments of the present disclosure, the previous descriptions regarding the terminal device 20 of the embodiments of the present disclosure can be referred to. In addition, the units/modules in the terminal device and other operations and/or functions described above are respectively provided to implement the corresponding processes of the method 200, and repeated descriptions will not be provided for brevity.

It should be understood that the processors in the embodiments of the present disclosure may be an integrated circuit chip which has signal processing capability. During implementation, each step of the foregoing method embodiments can be completed by an integrated hardware logic circuit in the processors or software instructions. Each of the above-described processors can be a general-purpose processor, a Digital Signal Processors (DSPs), an Application Specific Integrated Circuit (ASIC), a Field Programmable Gate Array (FPGA) or other programmable logic devices, discrete gates or transistor logic devices, discrete hardware components, which can implement or perform the methods, steps, and logical block diagrams disclosed in the embodiments of the present disclosure. The general-purpose processor can be a microprocessor or any conventional processor. The steps of the methods disclosed in the embodiments of the present disclosure can be directly completed by a hardware decoding processor, or by a combination of hardware and software modules in the decoding processor. The software modules can be located in a storage medium that is well-known in the art such as a random access memory, a flash memory, a read only memory, a programmable read only memory or an electrically erasable programmable memory, a register. The storage medium is located in the memory and the processor reads information in the memory and completes the steps of the above-described methods with its hardware.

It can be understood that the memory in the embodiments of the present disclosure can be a volatile memory or a non-volatile memory, or can comprise both volatile memory and non-volatile memory. The non-volatile memory can be a Read-Only Memory (ROM), a Programmable ROM (PROM), an Erasable PROM (EPROM), an Electrically EPROM (EEPROM) or a flash memory. The volatile memory can be a Random Access Memory (RAM) that serves as an external cache. By exemplary rather than limiting way, many forms of RAMs can be used, for example, a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It should be noted that the memories in the systems and methods described herein are intended to comprise, but not limited to, these and any other suitable types of memories.

An embodiment of the present disclosure further provides a computer program product including instructions which, when executed by a computer, cause the computer to perform the method for radio resource management measurement according to the embodiments of the methods. Particularly, the computer program product can be run on the above-mentioned network devices and terminal devices.

Those of ordinary skill in the art will appreciate that the exemplary units and algorithm steps described according to the embodiments disclosed herein can be carried out by electronic hardware or a combination of electronic hardware and computer software. Whether the functions are implemented by hardware or software depends on particular applications and design constraints of the technical solutions. For each of the particular applications, a person skilled in the art can use different methods to implement the described functions, but such implementation should not be considered as beyond the scope of the present disclosure.

It may be clearly understood by those skilled in the art that details of specific operation procedures of the systems, devices and units can be found in the previous description regarding the method embodiments.

In the embodiments provided in the present disclosure, it should be understood that the disclosed systems, devices and methods may be implemented in other ways. For example, the device embodiments described above are merely illustrative. For example, the division of the units is only a kind of logical function division. In practice, other division manner may be used. For example, multiple units or components may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical or other forms.

The units described as separated parts may or may not be physically separated, and the parts displayed as units may or may not be physical units, that is, the units may be located in one place, or may be distributed over multiple network units. Some or all of the units may be selected according to actual needs to achieve the objectives of the solutions in the embodiments.

In addition, the functional units in the embodiments of the present disclosure may be integrated in one processing unit, or the units may exist alone physically, or two or more units may be integrated in one unit.

The functions may also be stored in a computer-readable storage medium if being implemented in the form of a software functional unit and sold or used as an independent product. Based on such understanding, the essence of the technical solutions of the present disclosure, or the part contributing to the prior art or part of the technical solutions, may be embodied in the form of a software product. The computer software product is stored in a storage medium including a number of instructions such that a computer device (which may be a personal computer, a server, or a network device, etc.) performs all or part of steps of the method described in each of the embodiments of the present disclosure. The foregoing storage medium includes: any medium that is capable of storing program codes such as a USB disk, a mobile hard disk, a Read-Only Memory (ROM), a Random Access Memory (RAM), a magnetic disk or an optical disk, and the like.

The foregoing descriptions are merely exemplary embodiments of the present disclosure, but the protection scope of the present disclosure is not limited thereto. Any person skilled in the art can easily think of changes or substitutions within the technical scope of the present disclosure, and all the changes or substitutions should be covered by the protection scope of the present disclosure. Therefore, the protection scope of the present disclosure should be defied by the appended claims.

What is claimed is:

1. A method for measuring Radio Resource Management (RRM), comprising:
   sending, by a network device, measurement configuration information to a terminal device, the measurement configuration information comprising measurement mode information and/or report mode information, the measurement mode information being configured to indicate a target measurement mode in which the terminal device performs a RRM measurement based on at least one of a plurality of synchronization signal blocks transmitted in a target broadband component carrier, and the report mode information being configured to indicate a target report mode in which the terminal device reports a measurement result obtained by performing the RRM measurement based on the at least one of the plurality of synchronization signal blocks;
   wherein the target report mode is that all measurement results obtained by performing the RRM measurement based on at least one of the plurality of synchronization signal blocks are reported; or,
   the target report mode is that one of all measurement results obtained by performing the RRM measurement based on at least one of the plurality of synchronization signal blocks is reported.

2. The method according to claim 1, further comprising:
   determining, by the network device, the target measurement mode according to at least one of the following:
   whether the plurality of synchronization signal blocks are from co-located network devices, signal propagation characteristics of a plurality of frequency bands corresponding to a plurality of frequency domain locations carrying the plurality of synchronization signal blocks and a frequency domain location of a frequency domain resource configured by the network device for the terminal device.

3. The method according to claim 1, wherein the target measurement mode is one of the following measurement modes that: the RRM measurement is performed based on each of the plurality of synchronization signal blocks, the RRM measurement is performed based on each of a part of the plurality of synchronization signal blocks as indicated by the network device, the RRM measurement is performed based on one synchronization signal block that is selected by the terminal device, and the RRM measurement is performed based on all or a part of the plurality of synchronization signal blocks to obtain one measurement result.

4. The method according to claim 3, wherein if the target measurement mode is that the RRM measurement is performed based on all or a part of the plurality of synchronization signal blocks to obtain one measurement result, the one measurement result is an average of a plurality of intermediate measurement results obtained by performing the RRM measurement based on each of all or a part of the plurality of synchronization signal blocks.

5. The method according to claim 1, wherein the configuration information comprises the measurement mode information and the report mode information, and the method further comprises:
   determining, by the network device, the target report mode according to the target measurement mode.

6. The method according to claim 1, wherein sending the measurement configuration information to the terminal device comprises one of the following:
   sending broadcast signaling to the terminal device, wherein the broadcast signaling comprises the measurement configuration information;
   sending radio resource control (RRC) signaling to the terminal device, wherein the RRC signaling comprises the measurement configuration information; and
   sending downlink control information (DCI) to the terminal device, wherein the DCI comprises the measurement configuration information.

7. The method according to claim 1, wherein the RRM measurement comprises a measurement of reference signal receiving power (RSRP).

8. A method for measuring Radio Resource Management (RRM), comprising:
   receiving, by a terminal device, measurement configuration information sent from a network device, the measurement configuration information comprising measurement mode information and/or report mode information, the measurement mode information being configured to indicate a target measurement mode in which the terminal device performs a RRM measurement based on at least one of a plurality of synchronization signal blocks transmitted in a target broadband component carrier, the report mode information being configured to indicate a target report mode in which the terminal device reports a measurement result obtained by performing the RRM measurement based on the at least one of the plurality of synchronization signal blocks; and
   performing the RRM measurement and/or reporting the measurement result, by the terminal device, based on the at least one of the plurality of synchronization signal blocks according to the measurement configuration information;
   wherein the target report mode is that all measurement results obtained by performing the RRM measurement based on at least one of the plurality of synchronization signal blocks are reported; or,
   the target report mode is that one of all measurement results obtained by performing the RRM measurement based on at least one of the plurality of synchronization signal blocks is reported.

9. The method according to claim 8, wherein the target measurement mode is determined by the network device according to at least one of the following: whether the plurality of synchronization signal blocks are from co-located network devices, signal propagation characteristics of a plurality of frequency bands corresponding to a plurality of frequency domain locations carrying the plurality of synchronization signal blocks and a frequency domain location of a frequency domain resource configured by the network device for the terminal device.

10. The method according to claim 8, wherein the target measurement mode is one of the following measurement modes that: the RRM measurement is performed based on each of the plurality of synchronization signal blocks, the RRM measurement is performed based on each of a part of the plurality of synchronization signal blocks as indicated by the network device, the RRM measurement is performed based on one synchronization signal block that is selected by the terminal device, and the RRM measurement is performed based on all or a part of the plurality of synchronization signal blocks to obtain one measurement result.

11. The method according to claim 10, wherein if the target measurement mode is that the RRM measurement is performed based on all or a part of the plurality of synchronization signal blocks to obtain one measurement result, the one measurement result is an average of a plurality of intermediate measurement results obtained by performing the RRM measurement based on each of all or a part of the plurality of synchronization signal blocks.

12. The method according to claim 8, wherein the configuration information comprises the measurement mode information and the report mode information, and the target report mode is determined by the network device according to the target measurement mode.

13. The method according to claim 8, wherein receiving the measurement configuration information sent from the network device comprises one of the following:
   receiving broadcast signaling sent from the network device, wherein the broadcast signaling comprises the measurement configuration information;
   receiving radio resource control (RRC) signaling sent from the network device, wherein the RRC signaling comprises the measurement configuration information; and
   receiving downlink control information (DCI) sent from the network device, wherein the DCI comprises the measurement configuration information.

14. The method according to claim 8, wherein the RRM measurement comprises a measurement of reference signal receiving power (RSRP).

15. A network device, comprising:
   a processor;
   a memory for storing instructions executable by the processor;
   a transceiver;
   wherein the processor is configured to determine measurement configuration information; and
   the transceiver is configured to send the measurement configuration information to a terminal device, the measurement configuration information comprising measurement mode information and/or report mode information, the measurement mode information being configured to indicate a target measurement mode in which the terminal device performs RRM measurement based on at least one of a plurality of synchronization signal blocks transmitted in a target broadband component carrier, and the report mode information being configured to indicate a target report mode in which the terminal device reports a measurement result obtained by performing the RRM measurement based on the at least one of the plurality of synchronization signal blocks;

wherein the target report mode is that all measurement results obtained by performing the RRM measurement based on at least one of the plurality of synchronization signal blocks are reported; or, the target report mode is that one of all measurement results obtained by performing the RRM measurement based on at least one of the plurality of synchronization signal blocks is reported.

16. The network device according to claim 15, wherein the processor is further configured to:

determine the target measurement mode according to at least one of the following: whether the plurality of synchronization signal blocks are from co-located network devices, signal propagation characteristics of a plurality of frequency bands corresponding to a plurality of frequency domain locations carrying the plurality of synchronization signal blocks, and a frequency domain location of a frequency domain resources configured by the network device for the terminal device.

17. The network device according to claim 15, wherein the target measurement mode is one of the following measurement modes that: the RRM measurement is performed based on each of the plurality of synchronization signal blocks, the RRM measurement is performed based on each of a part of the plurality of synchronization signal blocks as indicated by the network device, the RRM measurement is performed based on one synchronization signal block that is selected by the terminal device, and the RRM measurement is performed based on all or a part of the plurality of synchronization signal blocks to obtain one measurement result.

18. The network device according to claim 17, wherein if the target measurement mode is that the RRM measurement is performed based on all or a part of the plurality of synchronization signal blocks to obtain one measurement result, the one measurement result is an average of a plurality of intermediate measurement results obtained by performing the RRM measurement based on each of all or a part of the plurality of synchronization signal blocks.

* * * * *